United States Patent
Attarwala

(10) Patent No.: US 7,187,989 B2
(45) Date of Patent: Mar. 6, 2007

(54) USE OF CORE PROCESS MODELS IN MODEL PREDICTIVE CONTROLLER

(75) Inventor: Fakhruddin T Attarwala, 1 Bellaire Dr., Princeton, NJ (US) 08540

(73) Assignee: Fakhruddin T Attarwala, Princeton, NJ (US)

( * ) Notice: Subject to any disclaimer, the term of this patent is extended or adjusted under 35 U.S.C. 154(b) by 226 days.

(21) Appl. No.: 11/017,328

(22) Filed: Dec. 20, 2004

(65) Prior Publication Data
US 2005/0137721 A1 Jun. 23, 2005

(51) Int. Cl.
*G05B 13/02* (2006.01)
(52) U.S. Cl. .................................................. 700/29
(58) Field of Classification Search .............. 700/28, 700/29, 31, 32, 33, 34, 38, 67, 51, 52, 53, 700/73, 74
See application file for complete search history.

(56) References Cited

U.S. PATENT DOCUMENTS

| | | | | |
|---|---|---|---|---|
| 5,347,446 A | * | 9/1994 | Iino et al. ........................ | 700/29 |
| 5,351,184 A | * | 9/1994 | Lu et al. ........................ | 700/45 |
| 5,541,833 A | * | 7/1996 | Bristol et al. .................. | 700/45 |
| 6,056,781 A | * | 5/2000 | Wassick et al. ................ | 703/12 |
| 6,373,033 B1 | * | 4/2002 | de Waard et al. ........... | 219/497 |
| 6,735,483 B2 | * | 5/2004 | Martin et al. .................. | 700/29 |
| 6,823,675 B2 | * | 11/2004 | Brunell et al. ................. | 60/773 |
| 6,925,338 B2 | * | 8/2005 | Eryurek et al. ................ | 700/30 |
| 6,988,017 B2 | * | 1/2006 | Pasadyn et al. .............. | 700/121 |

* cited by examiner

*Primary Examiner*—Thomas Pham

(57) ABSTRACT

A method is presented for updating process models (100) used in a model predictive controller when a change has been made in any regulatory controller configuration and/or it's tuning without having to conduct new full identification testing of the process. The method employs Core Process Models of Controlled Variables (101) and Manipulated Variables (103), devoid of dynamics of interacting regulatory controllers in conjunction with Manipulated Variables Disturbance Rejection Models (104). The process models (100) can be updated for use for on-line control as well as for off-line simulation studies including operator training. This allows updating of a complex multivariable process control with relatively ease with absolute minimal of additional data gathering.

18 Claims, 12 Drawing Sheets

A Complex Flow Schematic of a Fractionator

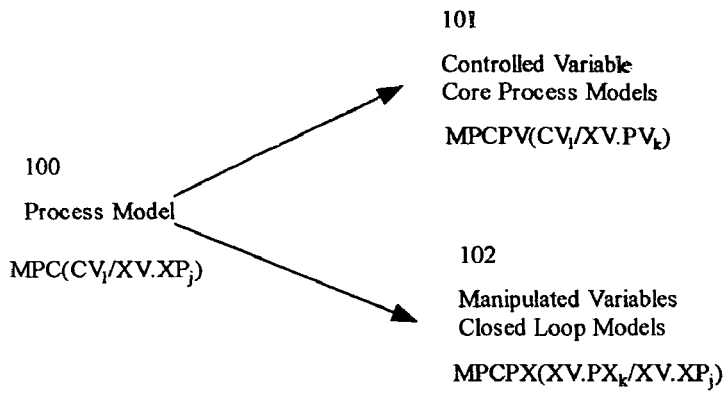
Fig 1.1 Process Model Characterization: Level 1
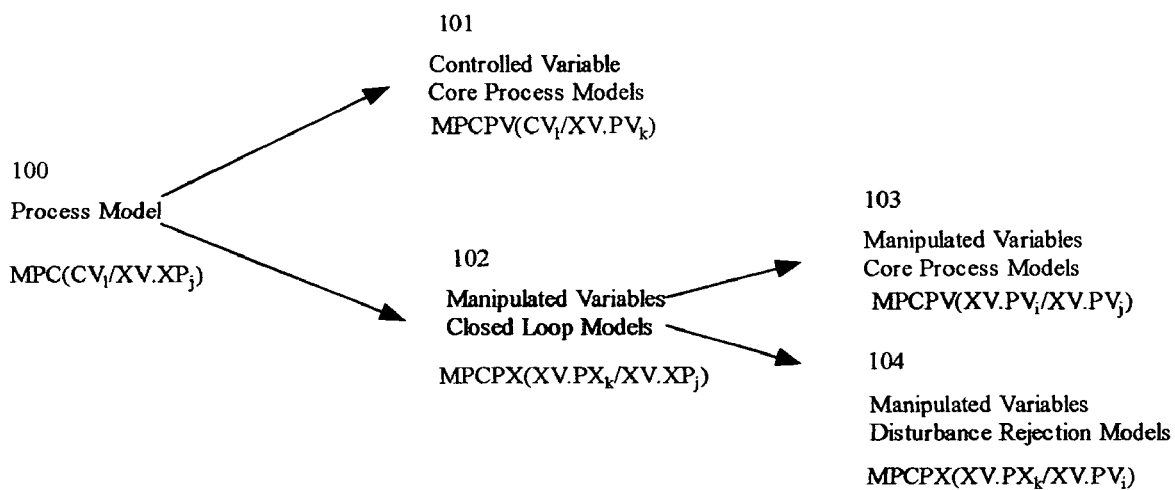
Fig 1.2 Process Model Characterization: Level 2

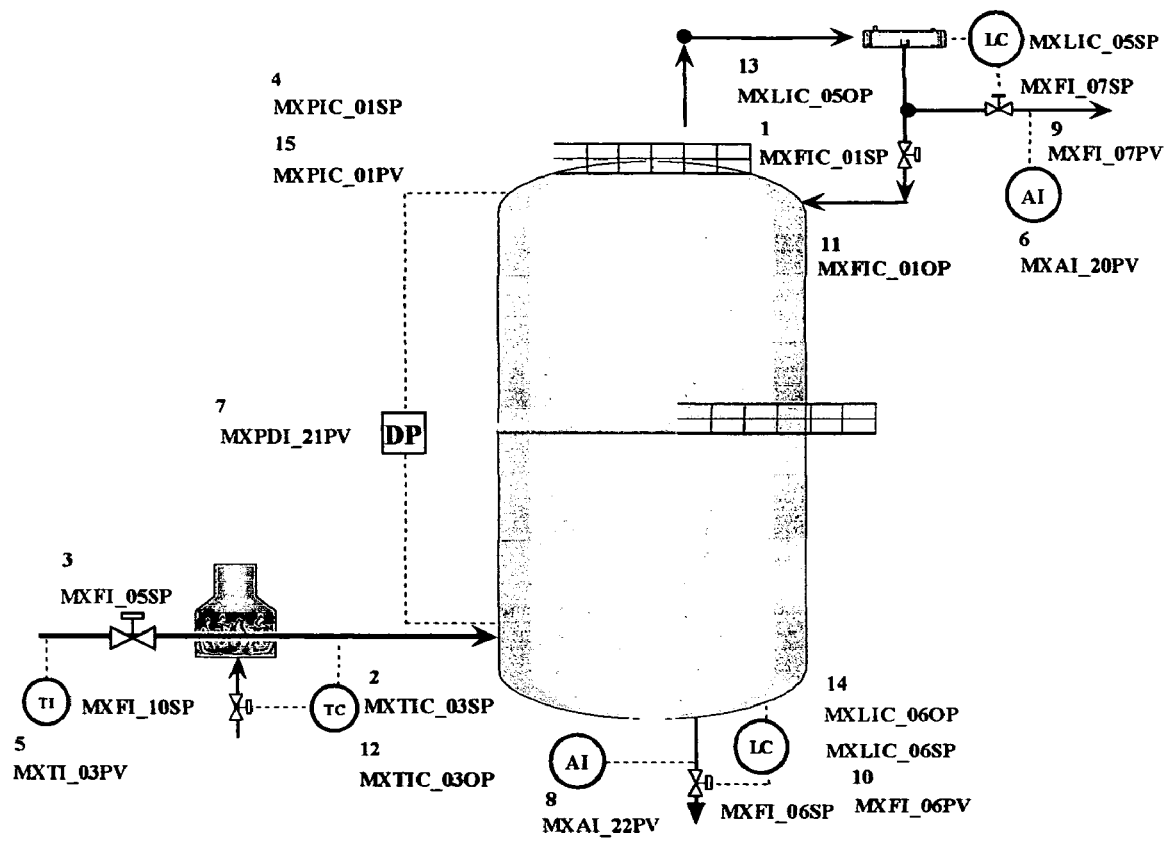
Fig 2. A Complex Flow Schematic of a Fractionator

Example: Flash Column

| LogicalName | ProcessVariable | Description | EngUnit | ReferenceNumeral (see Fig 1) |
|---|---|---|---|---|
| | Manipulated | | | |
| MV1 | MXFIC_01SP | Top Reflux Flow Controller Set Point | MBLD | 1 |
| MV2 | MXTIC_03SP | Feed Temperature Controller Set Point | degF | 2 |
| MV3 | MXFI_05SP | Feed Flow Controller Set Point | MBLD | 3 |
| MV4 | MXPIC_01SP | Column Pressure Controller Set Point | PSIA | 4 |
| | | | | |
| FV1 | MXTI03_PV | Feed Inlet Temp | degF | 5 |
| | Controlled | | | |
| CV1 | MXAI_20PV | Overhead Product Purity | %mole | 6 |
| CV2 | MXPDI_21PV | Column Pressure Differential | psia | 7 |
| CV3 | MXAI_22PV | Bottom Product Purity | %mole | 8 |
| CV4 | MXFI_07PV | Top Product Flow | MBLD | 9 |
| CV5 | MXFI_06PV | Bottom Product Flow | MBLD | 10 |
| CV6 | MXFIC_01OP | Top Reflux Flow Controller Output | % | 11 |
| CV7 | MXTIC_03OP | Feed Temperature Controller Output | % | 12 |
| CV8 | MXLIC_05OP | Top Level Controller Output | % | 13 |
| CV9 | MXLIC_06OP | Bottom Level Controller Output | % | 14 |
| CV10 | MXPIC_01PV | Column Pressure | PSIA | 15 |

Fig 3 Detailed descriptions of the variables of example process unit

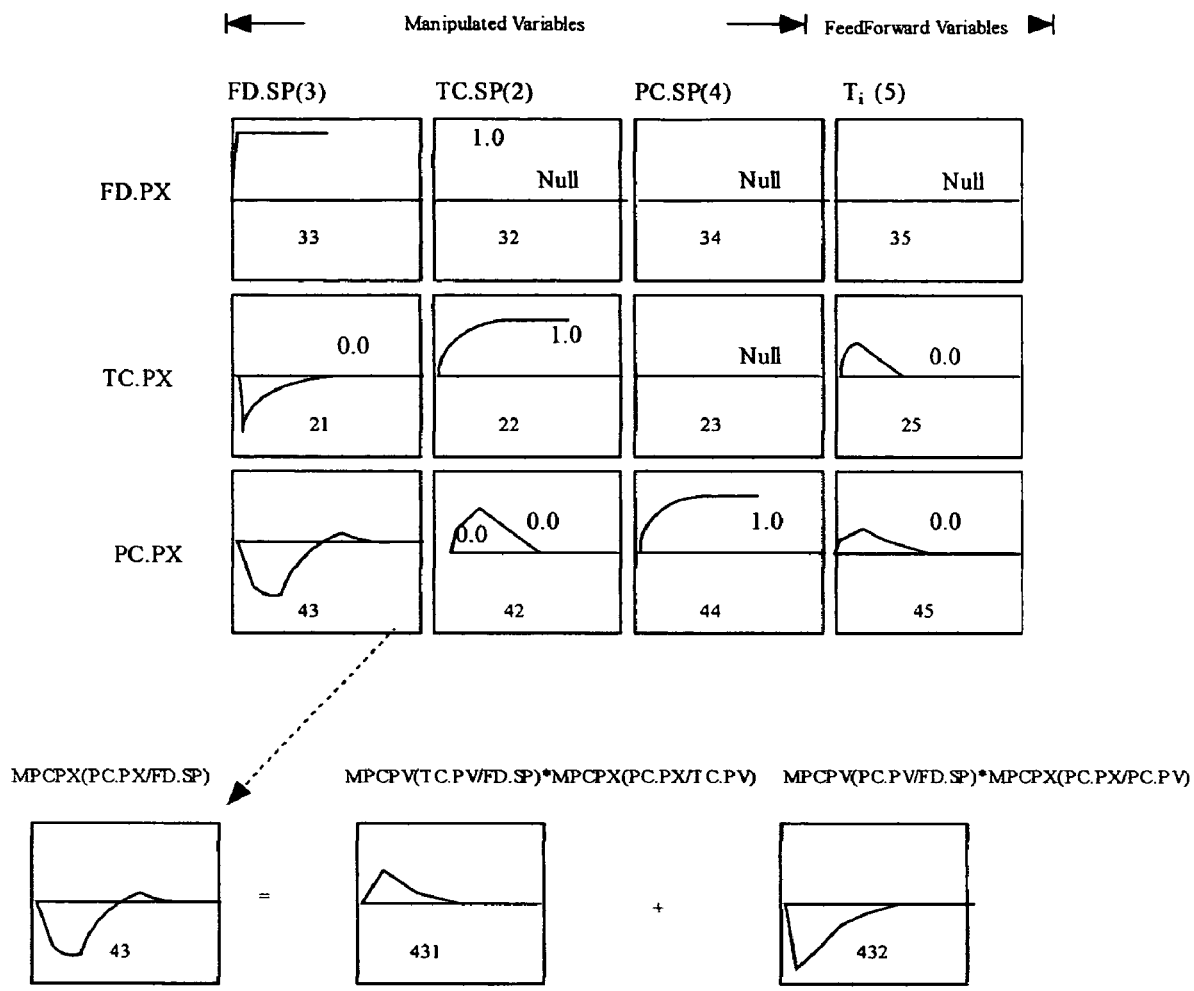
Fig 4.1 An illustrative example of Manipulated Variables Closed Loop Models

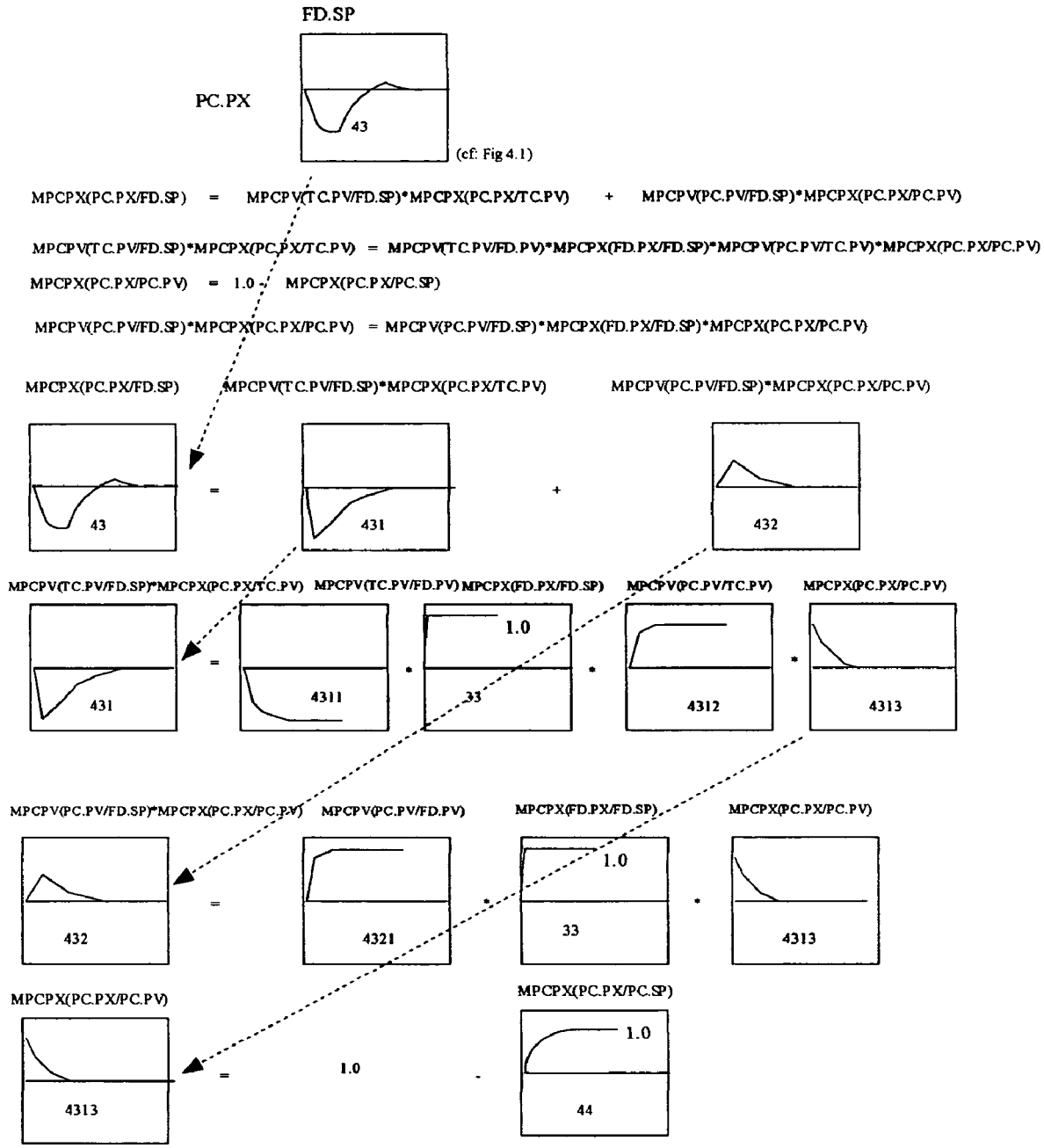
Note: Models 4311,4312,4321 relate to Manipulated Variables Core Process Models and are identified as per the additional plant testing as disclosed.
Models 33,44 relate to Manipulated Variables Closed Loop Models (see Fig 4.1)
Fig 4.2 Detailed Sub Process Models disclosure relating to Manipulated Variable Closed Loop Model, 43

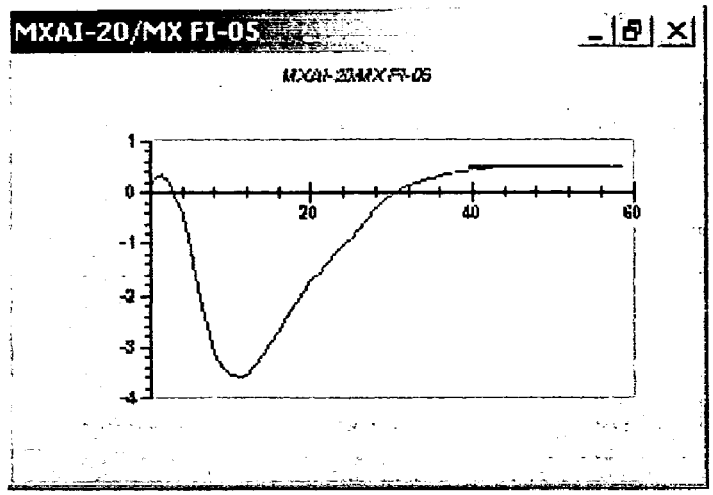
Fig 5.1 Original Model from a full plant testing
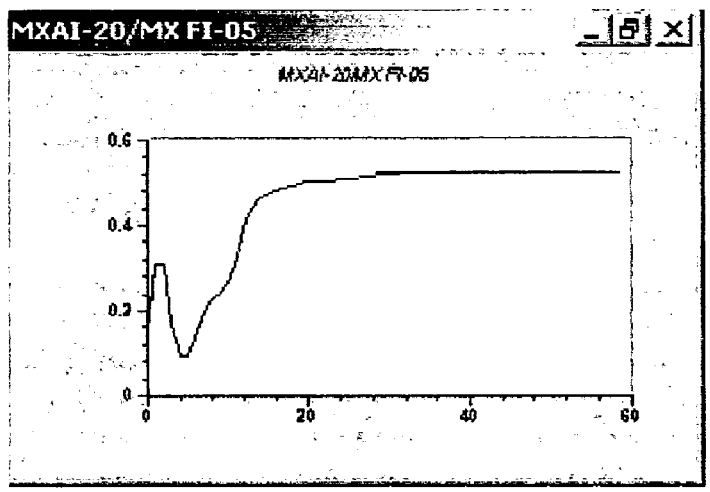
Fig 5.2 Updated Model as Per Invention following a change in tuning of MX-TIC03
Note: Same model gain but with different dynamic

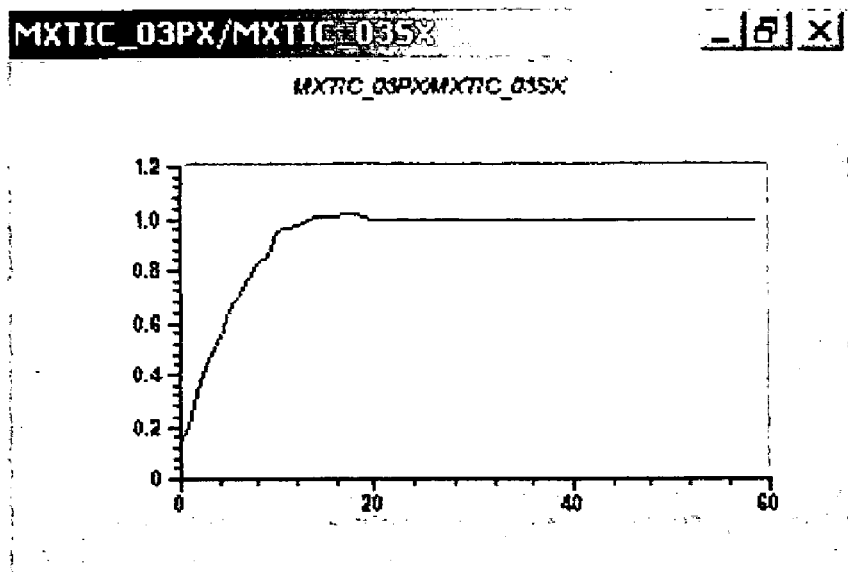
Fig 6.1 Tuning at the time of full plant testing
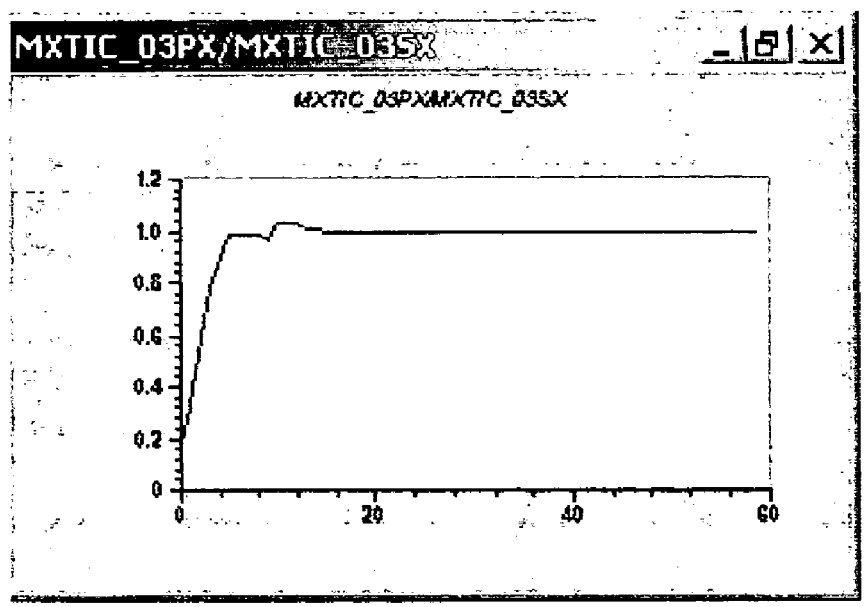
Fig 6.2 Post-full plant testing, new tuning of MXTIC-03

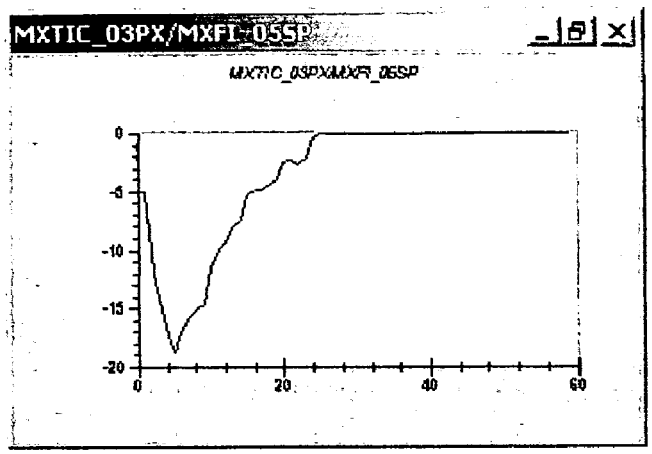
Fig 7.1 Original Response of MXTIC-03 to Feed rate change
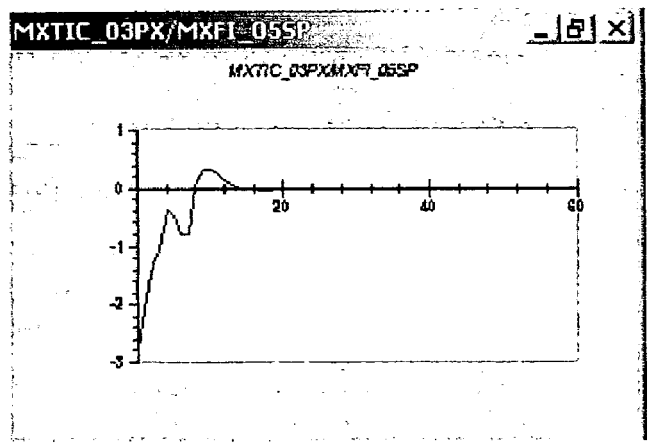
Fig 7.2 Improved Response of MXTIC-03 to Feed rate change resulting from new tuning of MXTIC-03

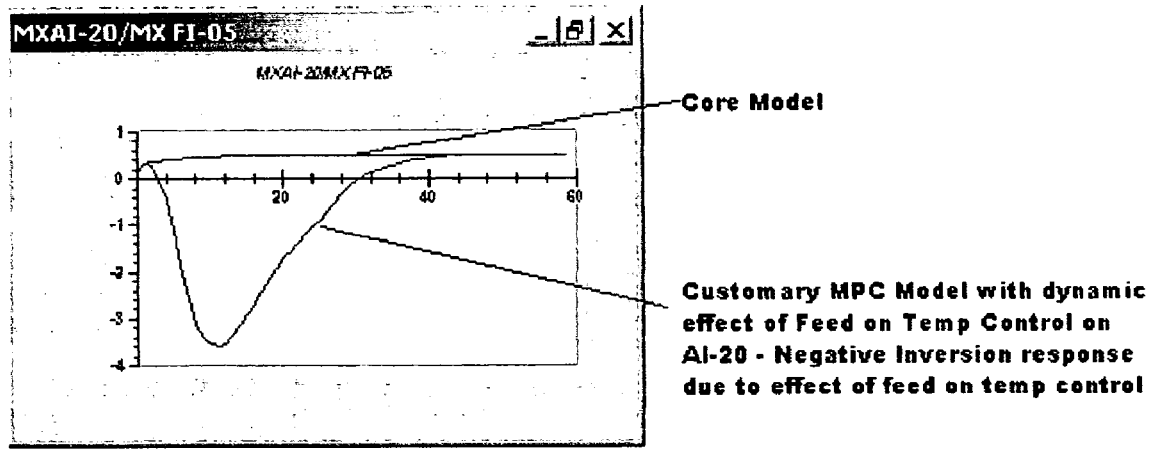
Fig 8.1 Comparison of customary MPC model and its Core Model from Full plant test
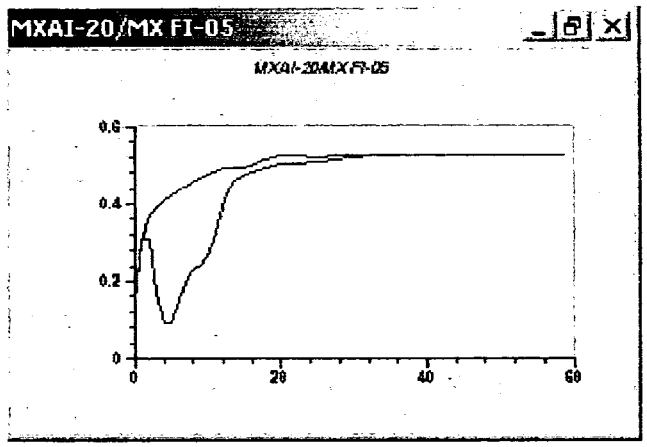
Fig 8.2 Comparison of updated MPC model and its Core Model Following Tuning Change
Note: Core model is same in both the cases above; differences in scaling make them appear differently.

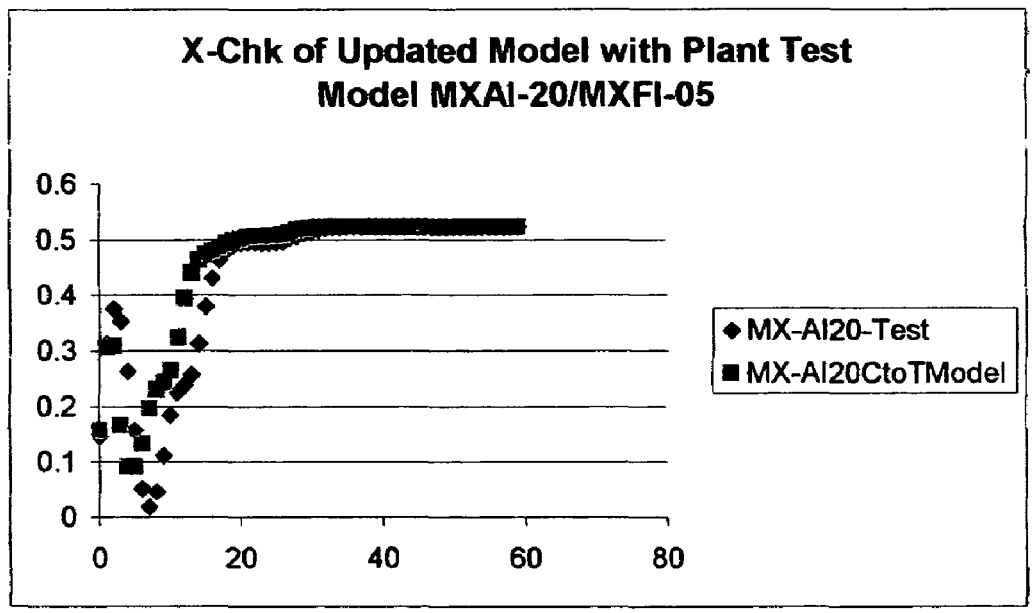
Fig 9 Validation of Model as Derived from application of the invention with as would be obtained from a full plant testing following a change in tuning of MX-TIC03 loop

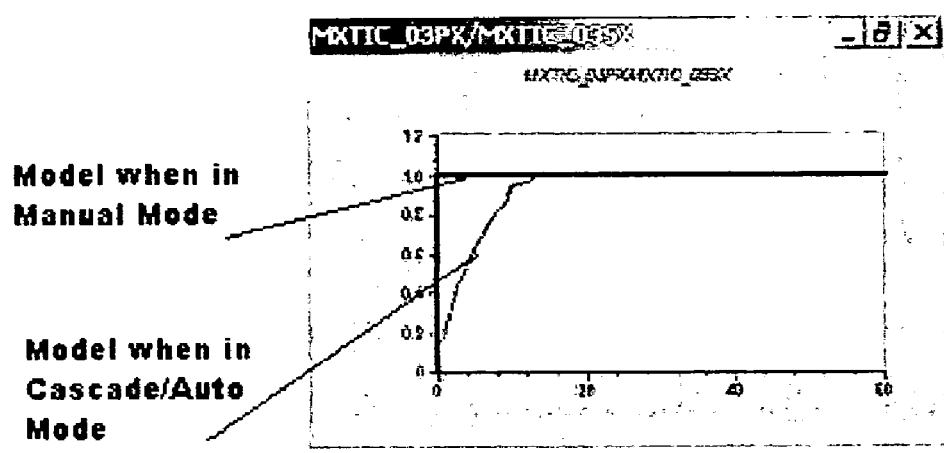
Fig 10. MV.PV Models for use with different MV.SP mode status

MV.PV/MV.SP

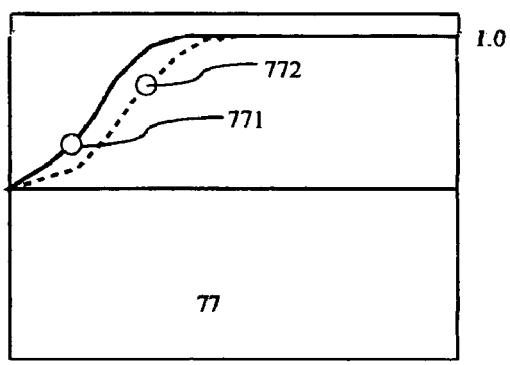

CV.PV/MV.SP (including CV.PV/MV.PV)

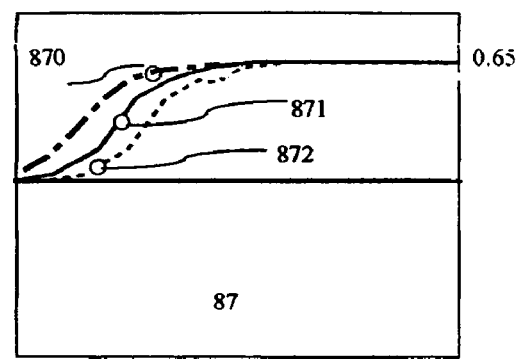

Fig 11.1 Manipulated Variable Closed Loop Model

Fig 11.2 Controlled Variable Process Models-Various

Notes:
Model 771 identified as per an initial plant test
Model 772 Would be Actual Model in presence of unmeasured Disturbance (e.g. Lower Calorific Value Fuel Gas)
Model 871 identified as per an initial plant test (in accordance with Model 771)
Model 872 Would be Actual Model in presence of the unmeasured disturbance
Model 870 Controlled Variable Core Process Model, i.e. CV.PV/MV.PV

USE OF CORE PROCESS MODELS IN MODEL PREDICTIVE CONTROLLER

FEDERALLY SPONSORED RESEARCH

Not Applicable

SEQUENCE LISTING OR PROGRAM

Not Applicable

BACKGROUND—FIELD OF THE INVENTION

This invention relates to updating of process models used in a model predictive controller, specifically to as it relates to when a change is made in the tuning/configuration of at least one of the manipulated variables regulatory controller without performing a new full plant identification testing.

BACKGROUND OF THE INVENTION

Model Predictive Control (MPC) has been in use in industry since early 1980. It forms the backbone of advanced process control in chemical plants, refineries and other process industries. MPC refers to a class of algorithms that compute a sequence of future manipulated variable adjustments in order to minimize the future response of complex multivariable processes. MPC performs real time optimization and control of simple to complex processes. A MPC controller employs a model of one form or other of the process to predict the effect of past changes of manipulated variables and measured disturbances on the output variables under control. The system dynamics are described by an explicit one to one model of the effect on the controlled variable to a unit change in the manipulated variable. A number of different mathematical forms can be used to represent the process effects. Process input and output constraints are included directly in the problem formulation so that future constraints violations are predicted and prevented.

Since its inception, MPC has evolved in terms of the form of model it uses. The most common form of the process model used is that of linear dynamic model. Typically, the linear dynamic model is developed from plant test data using appropriate model identification software. In preparation for the plant test, the regulatory controllers relating to the manipulated variables are carefully checked out and tuned for desired response. A considerable time and effort is spent to do this. The dynamic control models are developed from an intense study of the data gathered. Only good and well-behaved data slices are used to develop dynamic control models. Considerable care and planning is done to ensure that adequate amount of good and well-behaved data is collected for model identification later. The models thus developed entail considerable cost both in terms of engineering services and production disruption.

For most applications, MPC is implemented as an advanced control level above the process regulatory control level. The manipulated variables relate to set point of the regulatory controllers such as feed temperature set point, column pressure set point etc. In addition, a process has other regulatory controllers whose set point is not manipulated by the MPC but nevertheless which must remain under control at all time such as level control for an accumulator. Therefore, the models used in a MPC inevitably include dynamic response characteristics of the regulatory controllers, be they related to the manipulated variables or otherwise.

For the purpose of calculation of dynamic control action, it is assumed that the regulatory controllers would remain first of all under control, meaning their control out put would not saturate either at high limit or low limit and secondly their response to set point change and/or disturbances would remain unchanged from those assumed in the development of the process models. These are two very significant assumptions underlying any model predictive controller to work reliably and robustly. A third but often unstated assumed condition is that all of the regulatory controllers should remain in closed loop. That is to say, the configuration and tuning of all of the regulatory controllers within the scope of the model predictive controller should remain exactly same as what was assumed in developing the models, any deviation from these would have detrimental effect on the performance and cause unintended controller actions.

However, in cases, where regulatory controllers changes are necessary, then it is often necessary to re-identify the process models affected with the new changes and re-design, re-tune the MPC controller at considerable cost and efforts.

Furthermore, the models, which are identified at great expense, are strictly useful for a limited purpose of controlling the process under the strict condition that all of the regulatory controllers remain unchanged, no change in tuning as well as configuration allowed. For instance, even one of the regulatory controller is temporarily put in manual mode, could cause the controller to malfunction. Therefore, for most part in practice, in response to an alarm situation, when an operator responds to perform manual control action, in strict sense, the entire MPC controller would need to be taken off or else unintended control actions could result. There is no method available to adapt the MPC models to such situations easily in real time.

Numerous unsuccessful attempts have been made by practitioners in the field to address this identification issue, such as one in which plant identification testing is done with the regulatory controllers in open loop status. However, this fails because of the great difficulty of controlling the process with open loops during the plant test runs lasting 3–4 days. Another approach that is tried often is to conduct the plant testing under normal closed loop regulatory controller but then develop the model using the valve output as independent variable. However, this approach is inherently faulty in that the valve position responses under closed loop are highly correlated due to unmeasured disturbances and inter-closed loop regulatory interactions.

In a recent patent application pending, U.S. Pat. No. 20030195665 a method is disclosed for removing PID dynamics from MPC models. This is accomplished by replacing the manipulated variables set point as independent variables with their respective control valve position as independent variables. However, this method has a serious shortcoming arising from the fact that control valve output are known to exhibit non-linear behavior at or near their operating limits. By casting them as independent variables, all of the linear control models relating to them inherently and inexplicably would not predict the process values reliably and robustly. This could potentially affect process wide model mismatch errors leading to serious controllability problems. Although it might offer an elegant mathematical solution to the problem of removing PID dynamics from the control models, it is not clear how well the MPC controller would perform overall in real plant environment.

BRIEF SUMMARY OF THE INVENTION

An object of this invention is to provide a method for updating process models used in a multivariable model predictive controller for changes in manipulated variables tuning and configuration that can be used for on-line control use as well as off-line process training simulators.

It is a further object of this invention to provide such a method that can be used in various implementations of MPC controllers.

It is a further object of this invention to provide a method to generate new MPC controllers for complex multivariable process control when a change has been made in any regulatory controller configuration or tuning and to do so without having to conduct new identification testing of the process.

It is a further object of this invention to generate a process simulator that would provide a high fidelity process simulation, which can be used for off-line controller performance diagnosis as well as operator training. Such a simulator could be used for simulation in any controller configuration and with various tuning configurations on each individual controller.

It is a further object of the invention to provide an on-line adaptable configuration for a MPC controller for configuration changes made by the operator without having to do any new plant testing or controller configuration changes or tuning changes.

The essence of this invention is to offer a direct and simple method of adapting the process models used in a model predictive controller for changes in the regulatory controllers tuning and operator initiated controller mode configuration actions.

DRAWINGS

FIG. 1.1 Process Model Characterization: Level 1
FIG. 1.2 Process Model Characterization: Level 2
FIG. 2. A Complex Flow Schematic of a fractionator
FIG. 3 Detailed description of the variables of example process unit
FIG. 4.1 An illustrative example of Manipulated Variables Closed Loop Models
FIG. 4.2 Detailed Sub Process Models disclosure relating to Manipulated Variable Closed Loop Model, 43
FIG. 5.1 Original Model from a full plant testing
FIG. 5.2 Updated Model as Per Invention following a change in tuning of M-TIC03
FIG. 6.1 Tuning at the time of full plant testing
FIG. 6.2 Post-full plant testing, new tuning of MXTIC-03
FIG. 7.1 Original Response of MXTIC-03 to Feed rate change
FIG. 7.2 Improved Response of MXTIC-03 to Feed rate change
FIG. 8.1 Comparison of customary MPC model and its CoreProcessModel from Full plant test
FIG. 8.2 Comparison of updated MPC model and its CoreProcessModel Following Tuning Change
FIG. 9 Validation of ProcessModel as Derived from application of the invention with as would be obtained from a full plant testing following a change in tuning of MX-TIC03 loop
FIG. 10. MV.PV Models for use with different MV.SP mode status
FIG. 11.1 Manipulated Variable Closed Loop Model
FIG. 11.2 Controlled Variable Process Models-Various Reference Numerals in Drawings
See FIG. 2 for Reference Numerals 1–15; see FIG. 3 for their description
See FIG. 4 for other Reference Numerals used

DETAILED DESCRIPTION OF INVENTION

The present invention characterizes a dynamic process model relating to a controlled variable with respect to a manipulated variable set point as consisting of a defined set of sub process models as described herein. FIG. 1.1 and FIG. 1.2 depict two levels of process model characterization disclosed in this invention. The sub process models as disclosed below provide an explicit method of updating a process model when the manipulated variable tuning/configuration is changed with minimal additional model identification or no identification when done in conjunction with an appropriate simulator.

The invention presented herein seeks to characterize the underlying dynamic effects arising from the manipulated variables regulatory controller interactions into sub elements such that only a sub-set of the models need be re-identified in order to update the entire process models set used in a model predictive controller. Basically, a manipulated variable regulatory controller generates two dynamic interaction effects when a change is made to a manipulated variable set point, the first effect relating solely to dynamic effect resulting from dynamic response of the manipulated variable process value (generally process value is referred to as PV in the art), and the second effect relating to dynamic effect resulting from dynamic interaction responses of all other manipulated variables including other regulatory controllers (non-manipulated variables related) if any. The second effect relates to much of the complexity and intricacies of process interactions and in essence complicates dynamic response of the process.

The method disclosed for updating process models based on the component model characterization can be applied to a variety of method of identifying the process models initially and updating them later when a change is made in the tuning/configuration of the manipulated variable set point regulatory controller. In particular, the method disclosed further herein is intrinsically useful and effective for linearized dynamic models identified by way of plant testing and employing identification software as practiced commonly for use in a model predictive controller application. Therefore, for the purpose of exposition, linearized dynamic models will be referred to hereon in the context of identification methodology involving a plant testing although it is not limited by it. Those skilled in the art would appreciate the applicability of the present invention to a variety of situations involving process modeling methods used.

According to the present invention, a process model can be characterized as follows in reference to FIG. 1.1:

$$MPC(CV_l / XV.XP_j) = \sum MPCPV(CV_l / XV.PV_k) * MPCPX(XV.PX_k / XV.XP_j) + CV.Error_l \quad \ldots 1$$

for $j = 1, jmax$ $k = 1, kmax$ for $l = 1, lmax$ where,
CV refers to controlled variable
MV refers to manipulated variable
FV refers to feed forward variable
XV refers to either MV or FV
XP refers to SP for XV=Mv, refers to either PV or SP for XV=FV, mostly to PV
SP refers to set point of a manipulated variable PV refers to process value CV.Error represents a dynamic error profile for CV with a gain of 0.0.

Where j=1, Number of Manipulated variables+Number of Feed Forward Variables k=1, Number of Manipulated variables l=1, Number of Controlled Variables MPC( ) referred to as (100), MPCPV( ) referred to as (101) and MPCPX( ) referred to as (102) are used to designate the variables involved and the assumptions of process conditions as described further below.

MPC($CV_l$/XV.XP$_j$) (100) is a process model of controlled variable $CV_l$ with respect a unit change in independent variable XV.XP$_j$. Therefore, for a manipulated variable, it represents dynamic response of controlled variable $CV_l$ to a unit change in set point of the manipulated variable assuming that all other independent variables remain unchanged. Whereas, for a feed forward variable, it represents dynamic response of controlled variable $CV_l$ to a unit change in process value of the feed forward variable assuming that all other independent variables remain unchanged. As practiced in the art, this model would customarily be identified from a plant test and using an appropriate identification software. This is the model that is used in a model predictive controller for control and optimization;

MPCPV($CV_l$,XV.PV$_k$) (101) is similar to MPC($CV_l$/XV.XP$_j$) (100) except that it relates to manipulated variable process value as against manipulated variable set point. Therefore, MPCPV($CV_l$/XV.PV$_k$) (101) is a process model of controlled variable $CV_l$ with respect a unit change in independent variable XV.PV$_k$. For a manipulated variable, it represents dynamic response of controlled variable $CV_l$ to a unit change in process value of the manipulated variable assuming that process value of all other independent variables remain unchanged. Whereas, for a feed forward variable, it represents dynamic response of controlled variable $CV_l$ to a unit change in process value of the feed forward variable assuming that process value of all other independent variables remain unchanged. This model is identifiable from the plant data gathered in the same manner as MPC ($CV_l$/XV.XP$_j$) (100) with the manipulated variable process value as independent variable. In contrast to MPC($CV_l$/XV.XP$_j$) (100), MPCPV($CV_l$/XV.PV$_k$) (101) is independent of the manipulated variables tuning/configuration. Instead, it is intrinsically process dependent and devoid of all of inter manipulated variables dynamic interactions effects. Therefore, these models are termed as Controlled Variables Core Process Models.

MPCPX(XV.PX$_k$/XV.XP$_j$) (102) is a process model of manipulated variable k closed loop process value XV.PX$_k$ to a unit change in independent variable XV.XP$_j$ with all of the process regulatory controllers remaining in closed loop, in the same manner as MPC($CV_l$/XV.XP$_j$) (100) except that it relates to a manipulated variable process value instead of process value of a controlled variable. That is to say, MPCPX(XV.PX$_k$/XV.XP$_j$) (102) models relate to closed loop responses of the manipulated variables process value in response to unit change in each of the manipulated variables set point. Another way to characterize MPCPX(XV.PX$_k$/XV.XP$_j$) (102) is that for the case when k=j, it represents closed loop response of the manipulated variable process value XV.PX$_k$ for a unit change in its set point; and for the case when k≠j, it represents disturbance rejection model of the manipulated variable k, for a unit change in independent variable XV.XP$_j$. Thus, hereon, we will refer to this model in two different manners depending on its use. For case k=j, it represents manipulated variable process value response to a unit change in its set point, and for k≠j, it represents manipulated variable (feed forward) disturbance rejection model for a unit change in another independent variable. Furthermore, since this model relates similar to MPC( ) (100) model, except that it relates to manipulated variable process value (in closed loop) instead of controlled variable process value, these models can be derived in much the same way as MPC( ) models. Therefore, by definition, MPCPX (XV.PX$_k$/XV.XP$_j$) (102) is dependent on tuning of all of the manipulated variables as affecting XV.PV$_k$. Therefore, a change in tuning/configuration of any of the manipulated variables regulatory controllers would change MPCPX (XV.PX$_k$/XV.XP$_j$) (102). It follows from equation 1, that a change tuning/configuration will correspondingly change MPC( ) (100) models as one would expect. Thus, equation 1 provides a basis for updating MPC( ) (100) models when a change is made to the tuning/configuration to manipulated variables regulatory controllers.

CV.Error is expected to be a null model if all of the sub process models as per equation 1 are correctly and consistently identified. Any non-zero of CV.Error would be indicative of either missing model or mis-characterization of the sub process models. Typically, it should be of small dynamic value with a gain of zero value. For the purpose of exposition of the present invention, hereon we will assume that CV.Error is indeed a null model and hence will not be explicitly mentioned. However, those of ordinary skills in the art would appreciate that this assumption would not affect the workings and application of the method disclosed below.

In other words, from the above it follows that a Controlled Variable Core Process Model is basically a process model devoid of the dynamic interactions resulting from a change in the manipulated variable set point on other manipulated variables regulation. This characterization of Controlled Variable Core Process Model is important, as it will be evident later from further disclosure of the present invention, in that a process model required for a model predictive controller can be updated from a previously derived Controlled Variable Core Process Model whenever a change is made to any of the regulatory controllers of other manipulated variables. This allows for updating of process models used in a model predictive controller when a change is made to the tuning/configuration of any of the regulatory controllers relating to the other manipulated variables.

In equation 1 MPCPV($CV_l$/XV.PV$_k$)*MPCPX(XV.PX$_k$/XV.XP$_j$) denotes what is commonly known in the art as convolution of two process models. Convolution of two models such as A*B essentially involves applying a time series of changes of the independent variable as determined from model A to model B and accumulating the effects of such changes from model B. The resultant accumulative effect is said to be convoluted model of model A and model B. Hereon, wherever, two models are related in the form of A*B would imply their convolution.

As practiced in the art, MPC($CV_l$/XV.XP$_j$) is identified by way of plant testing as a one model entity without any reference to or identification of the component models constituting $\Sigma$MPCPV($CV_l$/XV.PV$_k$)*MPCPX(XV.PX$_k$/XV.XP$_j$).

The essence of the present invention is to identify all of the sub process models involved in equation 1 above from an initial plant testing and use them later as appropriate for model update when a change is made to the tuning/configuration of a manipulated variable regulatory controller without performing a new full plant testing.

It is clear from the definition of sub process models above, MPCPX( ) (102) models are singly dependent on the regulatory tuning of the manipulated variables controllers. Any tuning /configuration changes in them would require them to be updated. Thus, it is clear from equation 1, MPC( ) (100) models can be updated using previously identified MPCPV( ) models provided that MPCPX( ) (102) models are correctly updated in response to any changes to the manipulated variables regulatory controller.

Thus, based on the above disclosure, a method is disclosed below for updating process models used in a model predictive controller comprising the steps of 1. Identifying all of models MPC($CV_i$/$XV.XP_j$) (100), MPCPV($CV_i$/$XV.PV_k$) (101) and MPCPX($XV.PX_k$/$XV.XP_j$) (102) from an initial full plant testing comprising the following steps:
   i) performing plant test to gather data about the process by separately introducing at least one test disturbance in each of the manipulated variables and measuring the effect of the disturbances on the controlled variables and the manipulated variables process value;
   ii) identifying process models using the data gathered in step 1 and using an appropriate model identifying software as customarily done in the art. This would result in identification of MPC($CV_i$/$XV.XP_j$) (100) as described above.
   iii) Using the same data gathered in step 1 and identifying process models using the identification software to identify MPCPV($CV_i$/$XV.PV_k$) (101) models by using independent variables as manipulated variables process value and disturbance variable process value.
   iv) Using the same data gathered in step 1 and the identification software to identify MPCPX($XV.PX_k$/$XV.XP_j$) (102) models, this time the dependent variables used for identification correspond to the manipulated variables process value (presumably all in closed loop of course).

2. When a manipulated variable regulatory controller tuning is changed, the following method can be used to update the process models as obtained from step 1,
   i) a mini plant testing is done in which each of the manipulated variables set point is stepped up at least once and measuring the effect on the manipulated variables process value. The data gathered in the mini plant testing is then used to re-identify MPCPX ($XV.PX_k$/$XV.XP_j$) (102). This is followed by updating of process models MPC($CV_i$/$XV.XP_j$) (100) as per equation 1 using previously identified MPCPV($CV_i$/$XV.PV_k$) (101) from the initial plant testing and the re-identified MPCPX($XV.PX_k$/$XV.XP_j$) (102) from the mini-plant testing and convoluting them.
   ii) Alternatively, in lieu of actual plant test as described in step i) above, a simulator emulating all of the manipulated variables regulatory controllers as well as any other pertinent regulatory controllers can be used in which with changed tuning of the manipulated variable, each of the manipulated variables set point is stepped to generate the dynamic responses as pertaining to MPCPX( ) (102) models. The MPCPX( ) (102) models responses thus generated then can be used in equation 1 to update all of the process models relating to the controlled variables as affected by the tuning change.

In principle, the method described above can also be used when a configuration change is made to a manipulated variable in terms of its mode of operation as being set in manual by an operator's action. This would become evident when this is described in detail later.

Summarizing, MPC($CV_i$/$XV.XP_k$) (100) is what is customarily obtained by following the identification methodology. It includes in it the regulatory controller dynamics of not only MV. SP but also cross interaction of MV.SP to other MV.SP regulatory controller loops including dynamic loop interactions from the feed forward variables changes. Whereas, MPCPV( ) (101) (in essence same as MPC($CV_i$/$XV.XP_k$) (100) except they are Mv.PV-Based MPC model as against MV.SP): Typically, these models are not derived from the plant test data. But they can easily be derived from the same data (disclosed further later). Furthermore, MPCPX( ) (102) in equation 1 above basically forms a matrix of models depicting inter MV.PV interactions for a MV.SP change as illustrated in FIG. 4. When a change is made to any of the MV control loop, this models matrix needs to be updated provided new MV.PX/MV.SP response is available either from the testing of the loop in-situ plant or from an off-line simulation of the control loop with the new tuning. Typically, MPCPX( ) (102) models are not derived as part of process identification methodology. However, they can all be derived initially from the plant data gathered. Since, during the test, all of the regulatory controllers are configured correctly and well tuned and kept in closed loop, the data gathered can be used to derive these models. Therefore, to update MPC( ) (100) models for a change in regulatory controller configuration or tuning, all need to be done is to update MPCPX( ) (102) models, and then use equation 1 to update the entire set of models.

An example of application of the method of updating process models when a change is made to the tuning of a manipulated variable set point regulatory controller is presented below following further disclosure of the present invention.

The above method requires either an actual plant test or a simulation in which each of the manipulated variables set point must be stepped in order to update the process models, this can be time consuming and less efficient. Therefore, another preferred embodiment of the present invention is disclosed below in which a more efficient method of updating process models is described, which is also amenable for use on-line for updating process models for manipulated variables tuning changes/configuration changes.

As it will be shown below, only one and one MPCPX( ) (102) model is all needed to update the entire control models set for each change in the tuning/configuration. A method is outlined for updating MPCPX( ) (102) models following change in configuration and tuning of one or more manipulated variables below.

An extension of the preferred embodiment of the present invention as described above follows. In addition to equation 1, equation 2 below can be used in updating of process models. Based on what is said above regarding MPCPX ($XV.PX_k$/$XV.XP_j$) (102) being essentially same as MPC( ) (100) except for the dependent variable being different, MPCPX($XV.PX_k$/$XV.XP_j$) (102) can therefore be characterized by equation 2 in similar manner as equation 1, which is formally depicted in FIG. 1.2.

$$MPCPX(XV.PX_k / XV.XP_j) = $$
$$\sum MPCPV(XV.PV_i / XV.XP_j) * MPCPX(XV.PX_k / XV.PV_i) + $$
$$XV.Error_k \ldots 2$$

$$\text{for } j = 1, jmax \; i = 1, kmax \text{ for } k = k, kmax$$

and further $$MPCPV(XV.PV_i/XV.PX_j) = MPCPV(XV.PV_i/XV.PV_j) \\ *MPCPX(XV.PX_j/XV.X_j) \quad\quad 2.1$$

$$MPCPX(XV.PX_k/XV.PV_i) = MPCPV(XV.PV_k/XV.PV_i) \\ *MPCPX(XV.PX_i/XV.PVP_i) \quad\quad 2.2$$

$$MPCPX(XV.PX_i/XV.PV_i) = 1.0 - MPCPX(XV.PX_i/XV.XP_i) \quad\quad 2.3$$

where,

MPCPV($XV.PV_i/XV.PV_j$) referred to as (103) in equation 2.1 is an equivalent of MPCPV($CV_i/XV.PV_k$) (101) used in equation 1 except that in this case it relates to $XV.PV_i$. Like MPCPV($CV_i/XV.PV_k$) (101), MPCPV($XV.PV_i/XV.PV_j$) (103) is a process model of manipulated variable process value $XV.PV_i$ with respect to manipulated variable process value, $XV.PV_j$. This is a PV-to-PV model, which is therefore by definition independent of the manipulated variables regulatory controllers tuning. Furthermore, $XV.PV_i$ in MPCPV ($XV.PV_i/XV.PV_j$) refers to the manipulated variable i being in open-loop whereas all other manipulated variables remaining in closed-loop and $XV.PV_j$ refers to process value of all other manipulated variables in closed-loop. Therefore, as in case of MPCPV($CV_i/XV.PV_k$) in equation, MPCPV ($XV.PV_i/XV.PV_j$) is basically intrinsically related to the process and hence is termed as Manipulated Variable Core Process Model (103). Unlike MPCPV($CV_i/XV.PV_k$) (101), MPCPV($XV.PV_i/XV.PV_j$) (103) models are not directly identifiable from the data gathered from a customary plant identification testing. Instead, an additional plant testing is required as disclosed below for gathering data in conjunction with an initial plant identification test. Once this additional data is gathered, MPCPV($XV.PV_i/XV.PV_j$) (103) can be identified in the same manner as the method used for identifying MPCPV($CV_i/XV.PV_k$) as mentioned above.

MPCPX($XV.PX_k/XV.PV_i$) referred to as (104) in equation 2 above is best described as manipulated variable disturbance rejection models, meaning closed loop response of manipulated variable process value $XV.PX_k$ to a change in manipulated variable process value $XV.PV_i$. MPCPX ($XV.PX_k/XV.PV_i$) (104) is further defined via equation 2.2–2.3. Noting that MPCPV($XV.PV_k/XV.PV_i$) in equation 2.2 is of same form and meaning as MPCPV($XV.PV_i/XV.PV_j$) in equation 2.1. MPCPX($XV.PX_i/XV.PV_i$) in equation 2.2 is a special case of MPCPX($XV.PX_k/XV.PV_i$), but by definition is defined by equation 2.3 in terms of MPCPX ($XV.PX_i/XV.XP_i$) which is basically closed loop response of manipulated variable i regulatory controller.

A special case of MPCPX ($XV.PX_k/XV.PV_i$) in equation 2.2 for i=k is termed as "self disturbance rejection" model relating to the regulatory controller of manipulated variable i. In other words, it is a closed loop response model of manipulated variable i process value when its value is caused to change due to an effect other than its controller output or outputs. By definition it is therefore derivable from equation 2.3 above.

Like CV.Error in equation 1, XV.Error in equation is included as a dynamic error profile. It is expected to be a null model when all of the sub-process models involved in equation 2 are consistently and accurately identified. Therefore, a non-null XV.Error model would be indicative of either missing sub-process models or mischaracterization of sub-process models involved. For the purpose of exposition of the present invention, hereon we will assume that XV.Error is a null model and therefore will not be explicitly mentioned. However, those of ordinary skills in the art would appreciate that this assumption would not affect the workings and application of the method disclosed below.

The data gathered during an initial plant test as customarily performed and known in the art would permit identification of manipulated variables closed loop models of all of the manipulated variables. However, sub process models constituting manipulated variables closed loop models as defined via equation 2-2.3 would require an additional plant test in conjunction with the plant testing customarily done.

Thus, as per equation 1 and equation 2, a MPC( ) (100) model as customarily derived in the art is characterized by additional four types of models, namely Controlled Variable Core Process Models (101), Manipulated Variable Core Process Models (103) and Manipulated Variables Closed Loop (102) and Manipulated Variables Disturbance Rejection (104) step response models.

Now, we will disclose the additional plant testing required as a part of an initial plant testing for the purpose of identifying manipulated variables core process models. The following steps refer solely to the additional plant testing as a part of an initial plant testing carried out for identifying process models for a model predictive controller: The following additional plant testing is disclosed for the purpose of identifying MPCPV($XV.PV_i/XV.PV_j$) (101).

i) For manipulated variable i, set it to "manual" mode (meaning in open loop) while keeping all other manipulated variables (for j=1. kmax, except i=j) set point in their normal regulatory mode (meaning in closed loop), perturb each of the other manipulated variables set point separately and collect data about all of the manipulated variables process value and their controller outputs.

ii) Using the data gathered in step i identify all of MPCPV($XV.PV_i/XV.PV_j$) (103) models;

iii) Repeat steps i–ii, for i=1,kmax

The above additional testing would yield all of the models of MPCPV( ) (103) set except for i=j, which by definition is unity in any case. The above described additional plant testing will not be too onerous on the process operator as it requires that only one and one manipulated variable be put in manual mode at any time. Step ii) above need not be performed during additional plant testing, instead, the data gathered be saved accordingly and later use it for identifying MPCPV($XV.PV_i/XV.PV_j$) (103) respectively for each manipulated variable i. The choice of either of these two methods is a matter of style and convenience for the practitioner in the field.

The additional plant testing can be made more efficient by knowing the process topology. That is to say, in step i above, the manipulated variables, which are downstream to the manipulated variable i are not required to be perturbed thereby saving time and efforts. Since, in most cases, it is fairly easy to know the relative location of the manipulated variables in a process and therefore, adopting this tactic could save considerable time during the additional testing.

Now we will disclose the details pertaining to the method of updating process models for a change in tuning/configuration of a manipulated variable set point regulatory controller assuming that an initial plant testing including the additional plant testing was performed and all of the models as described above have been duly identified.

Summarizing, equation 1–2.3 provide a basis for updating process models for changes in tuning of one or more of the manipulated variables set point controllers once all of the sub models participating these equations are identified from an initial plant test data including an additional plant test referred to above for manipulated variable core process models. Thus, as proposed above, the present invention identifies four types of models from an initial plant test including the additional plant testing as prescribed above, namely, process models as customarily done for a model predictive controller, controlled variables core process models, manipulated variables core process models and manipulated variables disturbance rejection models. As it will be disclosed below; the additional three types of models identified as compared to practiced in the art, permit updating of process models later when a change is made to the tuning/configuration of one or more manipulated variables set point regulatory controller without having to undertake a full new plant testing. Instead, all needed is to re-identify closed loop response model of the manipulated variable process value to its set point for changed tuning/configuration either by way of live plant test for it or by emulation of the regulatory controllers using a simulator.

As per equation 1, updating of process models require that an updated MPCPX(XV.PX$_k$/XV.XP$_j$) (102) be done in response to a change in the tuning/configuration of a manipulated variable set point regulatory controller. As per equation 2, updating of MPCPX(XV.PX$_k$/XV.XP$_j$) (102) require that MPCPX (XV.PX$_i$/XV.PV$_j$) (103) be updated first. Only those models in MPCPX( ) (102), which are affected by a change in tuning/configuration of a manipulated variable set point regulatory controller, would need to be updated.

Based on the disclosure above, the method of updating process models used in a model predictive controller is further disclosed in terms of part I and part II. Part I relates to identifying all of process models and their sub process models from an initial plant testing including the additional plant testing as described above earlier. Part II relates to the method of updating the process models obtained in part I utilizing the sub models and newly identified model in response to a change in the tuning/configuration of a manipulated variable set point regulatory controller.

Therefore, from an initial plant test data, feed forward disturbance rejection models for each of the manipulated variables process value in closed loop can be identified. That is to say, both MPCPV(XV.PV$_k$/XV.PV$_i$) (101) and MPCPV (XV.PV$_j$/XV.XV$_i$) (103) are both identifiable from an initial plant test data. The former represents the feed forward rejection models with respect to other manipulated variable process value whereas the latter represents feed forward disturbance rejection models with respect to other manipulated variable process set point. But nonetheless, both of these two types of models are identifiable from an initial plant test. Those skilled in the art would appreciate that this is not a particularly difficult to do so. The rational for this is simple, as far as inter manipulated variables interactions are concerned they arise purely from effects of other manipulated variables process value and feed forward variables depending on the process topology.

Equations 1–2.3 offer an overall two-stage method of updating process models for a model predictive controller. In stage 1, all of the models pertaining to closed loop responses of process variables of the manipulated variables are updated in response to a change in tuning/configuration of any of the manipulated variables as per equations 2–2.3. In stage 2, the updated models of the manipulated variables process value are used in conjunction with previously derived Core Process Models for the controlled variables to complete updating of the rest of the process models as per equation 1.

Part I: Thus, according to the present invention, the following method would be used to identify models from the data gathered from an initial plant testing including the additional plant testing as described above:

1. Perform an initial full plant test as practiced in the art and gathered the data
2. Identify process models, MPC( ) (100) as customarily done in the art from the initial plant test data gathered.
3. Identify Controlled Variables Core Process Models from the data gathered in step 1.
4. From the data gathered in step 1, identify manipulated variables closed loop models, MPCPX( ) (102). This can be done when the data collected from the plant test includes all of the measurements pertaining to the process unit, which is commonly done in the art. In this case, MV.PX is to be used as dependent variables and MV.SP and FV.PV as independent variables.
5. Conduct additional plant testing as described above for identifying manipulated variables core process models,
6. From the additional plant data, identify manipulated variables core process models.

Part II: Assuming all of the models as described in Part I have been identified previously, the method described below can be followed to update the process models for a change in tuning/configuration a manipulated variable.

i) Step test the manipulated variable whose tuning is changed and collect the data of the manipulated variable process value while ensuring that the manipulated variable controller output is not saturated. From the data gathered, identify the manipulated variable closed loop model. This method can be applied in relation to a live plant test or using a simulator emulating the manipulated variable regulatory controller.

An alternate embodiment of the invention can be made in which in-lieu of equations 2–2.3 a simulation method is used to update all of the models relating to MPCPX( ) (102) in equation 1 when a change is made in at least one of the manipulated variables tuning/configuration. Such a simulation would emulate the regulatory controllers responses pertaining to each of the manipulated variables regulatory controllers and generate responses of all of the manipulated variables process value that would constitute MPCPX( ) (102). This simulator could be either an external emulator of the regulatory controllers involving PID controllers or could be a model predictive control based regulators.

Summarizing, the invention described herein utilizes the concept of CoreProcessModels recursively as relating to controlled variables and manipulated variables process value to first identify a set of different types of models for each one of these two types of variables from an initial plant test and later use them in conjunction with the updated model of manipulated variable closed loop process value to its set point when a change is made to tuning/configuration to its regulatory controller, just requiring one model to be re-identified.

Once process models are updated as described above, they can be used to predict future controlled variables based on current and future changes in the manipulated variables in conjunction with the current prediction of future values of the controlled variables based on the past changes to the manipulated variables in accordance with the configuration then. That is to say, new incremental changes to the future value of the controlled variables as per new tuning/configuration can be added to the prediction from the past changes. Then, given the predicted future controlled variables response based on no further manipulated variables changes and given the constraints of all manipulated variables in accordance with new configuration and dependent variables, the updated process models can be used to plan a strategy of manipulated variables moves to keep all manipulated variables and controlled variables within their respective constraints limits.

Two examples are presented below, one relating to constitution of matrix MPCMX( ) used in equation 1 and its sub models and another relating to updating of a process model when a change in tuning is made to a manipulated variable set point regulatory controller.

Method of use of the equations 1–2.3 will be illustrated further with the help of an example process unit such as one shown in FIG. 2. The detailed description of the variables relating to this example process unit is shown in FIG. 3 as consisting of 4 manipulated variables, 1 feed forward variable and 10 controlled variables. FIG. 4.1 represents the matrix of manipulated variables dynamic interactions. FIG. 4.1 is meant to represent an illustration of kind of models pertaining to this process unit as per equation 2 above. Those of ordinary skills in the art would appreciate that the models as shown in FIG. 4.1 and FIG. 4.2 are illustrative in nature only. Therefore, FIG. 4.1 and FIG. 4.2 are illustrative of MPCPX( ) models as set out in equation 1 and elaborated as per equation 2 and 2.3 respectively. For brevity, models pertaining to MPCPX( ) will be referred to with MV.PX as closed response PV of MV whereas MV.PV will be used to indicate open loop response PV of MV.

Null models in FIG. 4.1 refer to no causal relationship between the variables. For sake of brevity, we will use short form of reference to the variables of FIG. 2 in FIG. 4.1. As shown in FIG. 4.1, manipulated variable, FD.SP (3) has the simplest of the models. This arises from the fact that none of the other manipulated variables can affect FD.PX given the process topology of the process in FIG. 2. Manipulated variable (3) being a flow rate set point, its closed loop response FD.PX in FIG. 4.1 is shown as being fast with a gain of 1.0. Next, manipulated variable TC.PX is affected by a change its set point (2), a change in FD.SP (3) and a change in feed forward variable, $T_i$ feed inlet temperature (5). Therefore, as shown in FIG. 4.1, there are three models pertaining to TC.PX. As shown in FIG. 4.1 and FIG. 4.2, closed loop process value of column pressure, PC.PX is affected by FD.SP (3), TC.SP (2), $T_i$ (5) and of course, PC.SP (4). Of all models in FIG. 4.1, models relating to PC.PX fully represent what is meant to be described and used by the present invention. Therefore, we will use it for further illustration of application of equation 2 below. Equation 3 below defines PC.PX/FD.SP (43) as (assuming that a change in feed rate set point does not change reflux flow rate) PC.PX/FD.SP=TC.PV/FD.PV*FD.PX/FD.SP*PC.PX/TC.PV+PC.PV/FD.PV*FD.PX/FD.SP*PC.PX/PC.PV The following models are referred to in FIG. 4.1 and 4.2 as per following numerals:
PC.PX/FD.SP as 43
TC.PV/FD.PV*FD.PX/FD.SP*PC.PX/TC.PV as 431
PC.PV/FD.PV*FD.PX/FD.SP*PC.PX/PC.PV as 432
TC.PV/FD.PV as 4311
PC.PV/FD.PV as 4312
FD.PX/FD.SP as 33
PC.PX/PC.PV as 4313
And from equation 2.3, $$PC.PX/PC.PV=1.0-PC.PX/PC.SP$$

Models 4311,4312, and 4321 relate to Manipulated Variables Core Process Models and are identified as per the additional plant testing as disclosed above. Models 33 and 44 relate to Manipulated Variables Closed Loop Models, which are to be identified from an initial plant testing as customarily done.

Models 4311 and 4312 are examples of what is disclosed herein as Manipulated Variables Core Process Models and as described above, they would be identified as a part of the additional plant testing and identification method. That is, they would be identified as a part of open loop plant test of the manipulated variables controllers (referred to in additional plant testing part of an initial plant test above). PC.PX/PC.SP would also be identified as part of initial plant test and subsequently by way of simulation of PC controller loop in response to its tuning change.

The above completes all of the models required for updating PC.PX following a change in tuning any of the manipulated variables controllers affecting it. To initiate updating of all of the models set, the only type of model that must be updated first is MV.PX/MV.SP model for the manipulated variable whose tuning is changed. The method outlined above would work with one or more manipulated variables tuning change at the same time provided Mv.PX/MV.SP models for all of them are made available by way of simulation.

Summarizing, based on the method described above, FD.PX/FD.SP has the simplest of all closed loop models as its process value as it had no upstream manipulated variable. Whereas, as shown in FIG. 4.1, PC.PX/FD.SP (43), its model is dependent on the tuning of TC, FIG. 4.2 shows, how it can be updated using the various sub process models involved. In this case, when a tuning change is made to TC controller, TC.PX/TC.SP (22) would change and hence its new response model can be used to update PC.PX/FD. SP without any additional plant testing or identification. TC.PX/TC.SP would need to be identified following a tuning change to TC controller either by a plant test or by way of emulation of the regulatory controller response.

Therefore, according to FIG. 4.1 and FIG. 4.2 and the process described above, a tuning change in PC controller would result in the following new information being generated:

1.0 PC.PX/PC.SP (44) model is identified by way of emulation of the regulatory controller. This is the only model that is needed to be re-identified for updating the entire model set in response to any tuning/configuration change pertaining to PC regulatory controller.

2.0 PC.PX/FD.SP (43) is updated as per the details provided above.

3.0 As per FIG. 4.1, other affected models, (42) and (45) can be updated as per the method disclosed above.

Note that the updating of the interacting manipulated variables models matrix as depicted in FIG. 4 is done without any live plant testing.

The models updated for the interacting manipulated variables are then used in equation 1 to update rest of the models in the system.

The above method as disclosed can be automated for the purpose of updating all of the models in a suitable simulation system. Those of ordinary skills in the art would appreciate that a simulation system could be developed that would automatically perform all of the steps of model updating as disclosed above including a new Mv.PX/MV.SP model from an external emulation of the regulatory controller or it being embedded as a model predictive control on its own way with its appropriate feed forward variables as per the Closed Loop interactions matrix as depicted for the example process unit in FIG. 4.

Now we will elicit another embodiment of the invention relating to updating the entire set of models when the operator sets a manipulated variable controller in "manual"

mode. This condition will be characterize alternatively as the controller is being in "OpenLoop" status. In this case, it will be assumed that the manipulated variable set point will track its process value while the controller remains in the manual mode. Hence by this requirement, model MPCPX $(XV.PX_j=XV.XP_j)$ (102) would be devoid of any dynamics with a gain of 1.0. That is to say, for the purpose of its use in equation 1 and equation 2 closed loop model MPCPX $(XV.PX_j/XV.XP_j)$ is considered to have an instantaneous response with a gain of 1.0.

Further, by definition, MPCPX$(XV.PX_k/XV.PV_k)$ in equation 2 and MPCPX$(XV.PX_j/XV.PV_j)$ in equation 2.1 for Open Loop condition, each of these two models would have a gain 1.0 instead of gain of 0 in Closed Loop condition with instantaneous response with respect to the manipulated variable controller that is in open loop status.

That is to say, the manipulated variable which is in manual mode, its closed loop model with respect to its set point would have a gain of 1.0 with no dynamics whereas its closed loop model with respect to its process value (as disturbance rejection model) would have its gain changed to 1.0 (from 0.0) with no dynamic. With these changed models for the manipulated variable in manual mode, and using equation 1 and equation 2 along with equation 2.1, all of the model set in the model predictive controller can be updated without having to conduct any additional plant testing. Those of ordinary skills in the art would appreciate these two changes in the models could significantly affect the process models for the controlled variables affected by the manipulated variable. Therefore, the present invention is able to handle such significant changes in the process models without requiring re-testing the process unit in any way for the operator's action of setting a manipulated variable set point in manual mode. This is a significant improvement in what is currently practiced in the art and therefore would allow dynamic adaptation of the models when such operator's action is taken. One practical consequence of this is that this ability to dynamically adapt would permit the model predictive controller continue to perform while the operator is attending to the problem at hand by his/her manual intervention. In contrast, as practiced in the art almost inevitably the model predictive controller would have to be taken off completely when the operator performs such manual actions. This will ensure that the MPC models used in the MPC controller remain consistent with the new configuration and thus continue to perform closed loop control of the rest of the process under changed manipulated variables configuration.

Another operator action that is commonly applied is to keep a manipulated variable in its automatic status for regulatory control in which its set point is not to be changed by the model predictive controller. That is to say, the operator, breaking its cascade with the model predictive controller, sets the manipulated variable set point in "Auto" mode. When this happens, no change of models as described for manual mode apply. Instead, the manipulated variable set point permitted high/low range is clamped to its current set point value so that the model predictive controller cannot change it in any way.

Now we will demonstrate application of the method described herein as per equation 1 for a specific case of model update following a change in regulatory controller tuning of a manipulated variable without performing plant test by way of simulation. In particular, the results of simulation would compare the changed models before and after tuning change applied to the manipulated variable, TC.SP as affecting model MXAI_20PV/ MXFI_05SP. For brevity we will denote MXAI_20PV as a0 (6) hereon and MXFI_05SP as FD.SP (3).

FIG. 5.1–7.2 shows all of the models as obtained from an initial full plant test with those as updated as per the method disclosed above following a change in tuning of the manipulated variable, TC.SP.

FIG. 5.1 and FIG. 5.2 compares process model of a0/FD.SP as obtained from an initial full plant test with an initial tuning of TC.SP as shown in FIG. 6.1 with an updated model of it with a new tuning of TC.SP as shown in FIG. 6.2.

For the purpose of exposition of the present invention, in-lieu of using equation 2–2.3 for updating manipulated variables closed loop process value models as mentioned above, a simulation was performed in which the feed rate was increased by 1 unit and the resulting response of MXTIC_O3 was captured as shown in FIG. 7.2. FIG. 7.1 & 7.2 shows comparison of what is herein called Dynamics-InteractionModel arising from the interaction of FD.SP to TC.SP as per the tuning of the temperature controller during the full plant test and as per new tuning TC. SP post-full plant test. In this case, improved tuning of the temperature controller obviously minimizes dynamic interactions on feed temperature control.

FIGS. 8.1 & 8.2 compare process models of a0/FD.SP before and after tuning change of TC.SP along with its core process model, which of course remains unchanged in this case, noting that the updated model of a0/FD.SP was obtained by application of equation 1 and the method described above.

FIG. 9 validates the updated model as per the method disclosed in this invention with the same model as would be identified from a new plant test. As shown, clearly the updated model matches very well with would be identified model with a full plant test.

As another embodiment of the present invention, a method is disclosed below for on-line re-configuration of MPC Controller in response to the operator's action of manual mode, auto mode and cascade mode for one or more manipulated variables set point.

Equation 1–2.3 above provides the basis for re-configuration of a MPC controller when a change is made to the tuning/configuration of one or more manipulated variables regulatory controller on line. The steps involved for this are as follows:

Following are the steps of the methodology to be applied for three modes of operations as selected by an operator, namely manual mode, auto mode and cascade mode for a manipulated variable set point.

The following method pertains to configuration changes relating to the operator action of putting the controller output is in manual mode.

1.0 Operator sets the manipulated controller status as "manual"

2.0 MPC controller recognizes change in the MV configuration, new configuration being manual, 3.0 Internally, MV.PX/MV.SP model is set to as being a unit step response model with no dynamic (see FIG. 10). This is followed by updating of all of the models affected by this MV.SP using equation 1 & 2 above. And the MPC controller control moves calculation matrix is updated.

4.0 The MV output high limit and low limit are set to its current value internally 5.0 Internally, MPC controller performs what is herein called "MVSPTracking", i.e. sets MV.SP=MV.PV. The effect of change in MV.SP resulting from this is reflected on the rest of MPC controller using the updated controller models.

6.0 Normal, multivariable controller control solution is done to calculate new optimal solution and control move calculation is performed.

7.0 Control moves are implemented 8.0 If no change in the Mv.SP configuration is made, then repeat step 4–7. Else, if the operator changes MV.SP configuration to either "Cascade" or "Auto" then follow the steps for new mode status.

The following method pertains to configuration changes relating to the operator action of putting the controller output is in Cascade mode.

1.0 Operator sets the MV status to "Cascade"

2.0 MPC controller recognizes change in the Mv configuration as from manual to cascade 3.0 Internally, Mv.PX/MV.SP model is restored to its normal MV.PX/MV.SP response model as identified by the full plant test. This is followed by updating of all of the models affected by this Mv.SP using equation 1 & 2 above. And the MPC controller control moves calculation matrix is updated.

4.0 The MV output high limit and low limits are restored to their corresponding normal limits as set by the operator 5.0 No "MVSPTracking" to be applied this time for change of configuration.

6.0 Normal, multivariable controller control solution is done to calculate new optimal solution and control move calculation is performed.

7.0 Control moves are implemented.

8.0 If no change in the MV.SP configuration is made, then repeat step 4–7. Else, if the operator changes MV.SP configuration to "Manual" or "Auto" then follow the steps for new mode status.

The following method pertains to configuration changes relating to the operator action of putting the controller output in Auto mode. The operator sets a MV.SP in "Auto" status.

1.0 Operator sets the MV status to "Auto".

2.0 MPC controller recognizes change in the MV configuration as from manual to cascade 3.0 Internally, MV.PX/MV.SP model is restored to its normal MV.PX/MV.SP response model as identified by the full plant test. This is followed by updating of all of the models affected by this MV.SP using equation 1 & 2 above. And the MPC controller control moves calculation matrix is updated.

4.0 The MV output high limit and low limits are restored to their corresponding normal limits as set by the operator. MV.SP high and low limits are set at its current MV.SP value.

5.0 No "MVSPTracking" to be applied this time for change of configuration.

6.0 Normal, multivariable controller control solution is done to calculate new optimal solution and control move calculation is performed.

7.0 Control moves are implemented.

8.0 If no change in the MV.SP configuration is made, then repeat step 4–7. Else, if the operator changes MV.SP configuration to "Cascade" or "Manual" then follow the steps for new mode status.

As an alternate embodiment of the present invention, an alternate method of plant identification testing is disclosed which shortens length of the test with minimal rejection of data collected, both of these potentially significantly reducing the overall cost of plant test.

The method of updating process models presented herein offers a direct and flexible method of adapting the process models to aid the operator to continue to use the model predictive controller in a variety of process situations, the process models can literally be adapted in real-time in response to the operator's actions and thus permitting continual use of the controller. Thus, a simulator can be built that would assist in an operator training in dealing with dynamically changing process situations and his manual intervention in continuing to keep the process under control. The model updating methods presented herein would provide high fidelity process situations for the operator to accurately train on. This would also enhance the operator's ability to deal with abnormal operating situations.

Another embodiment of the present invention relates to feed back correction of predicted controlled variable values in a model predictive controller. An alternate method of correcting the predicted value of controlled variables using the core process models is disclosed below. As practiced in the art, a bias correction is applied to future predicted value of the controlled variables. The bias correction b (see equation 2.4) is calculated as difference of current measured value of the controlled variable minus current predicted value of the controlled variable using its process models:

$$b = y - y_p \qquad 2.4$$

where, y is measured value of the controlled variable, $y_p$ is predicted value of the controlled variable as per its process models.

The underlying problem with using bias correction b is that irrespective of the source of error, same method of correction is applied. As a result, at times inconsistent and inappropriate control actions are performed. One particular source of error that is prevalent in most model predictive controller is due to the deviation of the manipulated variable process value from its value as per its assumed closed loop dynamic response model. By definition this error is transitory and yet application of a bias type correction to the predicted value of the controlled value treats as if its "gain" has changed. Consequently, the steady state optimizer would unnecessarily determine a new steady state solution and thereby induce on its own a cycling of error. Whereas, as disclosed below, use of the core process model based bias correction would minimize/eliminate the self-induced cycling of error. A new bias correction B is proposed as $$B = y - y_c \qquad 2.5$$

Where, $y_c$ is predicted value of the controlled variable using its core process models. Thus, the proposed bias correction would entail having in addition to the as practiced in the art predicted value of the controlled value using the process models, another predicted value of the controlled value using its core process models. This additional prediction of the controlled variable is fairly straightforward. When the source of error relates purely to the deviation of closed loop response of the manipulated variable, it is expected that |B| will be of small value in comparison with |b|. Therefore, use of B for correcting the controlled variable predicted value will consequently eliminate/minimize the self-induced cycling of error arising from the steady state optimizer solution.

The use of core process model based bias correction is further explained in reference to FIG. 11.1 and FIG. 11.2. FIG. 11.1 depicts Model 771 as the closed loop response model as identified from an initial plant test. Whereas, Model 772 depicts a deviation from Model 771 due to either a change in tuning or unmeasured disturbance effect in the manipulated variable regulatory controller. Note that Model 772 would be the true model under new process condition; however, the process models used in the controller do not reflect this new closed loop model. Hence, clearly a model mismatch would be present. This is shown in FIG. 11.2 as it relates to the controlled variable affected by the manipulated variable. Model 871 in FIG. 11.2 is the original model identified from an initial plant test in conformance with the closed loop model 771 of FIG. 11.1. Whereas, Model 872 would be the correct model in accordance with the changed closed loop behavior of the manipulated variable as per Model 772. Noting that Model 872 is not yet identified and the controller still uses Model 871 to predict the controlled variable response. Model 870 in FIG. 11.2 is the core process model in this case.

In this situation, the core process Model 870 will predict correctly the controlled variable value to be lower than the value as would be predicted using process Model 871. In fact, in this particular example situation, the core process model 870 would correctly predict the controlled variable value resulting in the bias correction B as per equation 2.5 to be zero. This result is not unexpected, as the core process Model 870 by definition being independent of the manipulated variable regulatory tuning, would therefore predict the controlled variable correctly in response to the unmeasured disturbance effect. Thus, the core process model based prediction of the controlled variable would correctly discount what would otherwise be a "gain change" error in the bias correction calculation. Consequently, the self-induced cycling of error would not occur.

Once process models are updated as per the method disclosed above, they can be used to predict future system response based on past changes in the manipulated variables and the measured disturbances. That is to say, if we know how all independent variables have changed for one steady state time period in the past, we can use the updated models to predict how the dependent variables will change for one steady state time into the future, assuming no further independent variable changes. This illustrates the use of the updated models for prediction. Given the predicted future process response based on no further independent variable changes and given the constraints on all independent and dependent variables, the updated models can be used to plan a strategy of the manipulated variables moves to keep all manipulated variables and dependent variables within constraints. This illustrates the use of the updated models for control.

Another preferred embodiment of the present invention is disclosed in regard to its application to plant testing for identification of linearized dynamic models.

Equation 1 can be re-written as $$MPC(CV_i/XV.XP_j) = MPC(CV_i/XV.PV_j) * MPCPX(XV.PX_j/XV.PV_j) \quad \quad 3$$

Additionally, $$MPCPX(XV.PX_k/XV.X_j) = MPCPX(XV.PX_k/XV.PV) * MPCPX(XV.PX_j/XV.PV_j) \quad \quad 3.1$$

Basically equation 3 and 3.1 provide a way of deriving SP-based $MPC(CV_i/XV.XP_j)$ and $MPCPX(XV.PX_k/XV.XP_j)$ models as required for equation 1 and 2 from their corresponding PV-based models, that is $MPC(CV_i/XV.PV_j)$ and $MPCPX(XV.PX_k/XV.PV_j)$. This allows for identification of $MPC(CV_i/XV.PV_j)$ and $MPCPX(XV.PX_k/XV.PV_j)$ from a plant test and later have them converted to SP-based for use in a model predictive controller. Therefore, an alternate method of plant identification can be followed in which an initial plant testing is done as practiced in the art followed by the additional plant testing disclosed above for the purpose of identifying Manipulated Variables Core Process Models. However, for model identification, instead of using manipulated variables set point as independent variables, manipulated variables process value are used as independent variables. This would result in identification of $MPC(CV_i/XV.PV_j)$, $MPCPV(CV/XV.PV_k)$, $MPCPV(XV.PV_i/XV.PV_j)$ and $MPCPX(XV.PX_k/XV.PV_j)$. Using equation 3 and 3.1, all of these models can be translated as required to work in equations 1–2.3.

The above method of identifying PV-based models followed by their translation to SP-based models provide a more effective and time saving method of plant testing and model identification. As against SP-based approach as customarily used, in PV-based model identification, more of the plant test data is usable. The SP-based approach requires that the data used in model identification is devoid of valve saturation and all of the manipulated variables process value at or near their set point. Both of these require more data and longer time to test, whereas with the PV-based method both of these two conditions are not strictly binding.

The process models and sub process models as disclosed above can be incorporated into a simulator which would permit an operator to train on varying plant situations involving changes to the manipulated variables controller tuning and configuration. The models as disclosed above can be updated in dealing with different operators actions, plant events and abnormal operation situations. The updated models can be used to update the controller actions and hence train the operator how the controller can continue to control the rest of the process while he is concentrating on a part of the process. This would help to increase on-line use of the controller.

APPLICABILITY OF THE INVENTION

In the past, when the PID controllers were re-tuned or when the regulatory control scheme was reconfigured, a new plant test was performed and a new set of models was constructed. The invention described in this document offers a method of adapting and updating the controller models in accordance with changed configuration without having to perform another plant test.

This ability to adapt controller models allows for on-line as well as off-line use. For on-line use, the controller models can be updated fairly easily and the controller move matrix re-computed. For each change in the regulatory controller configuration change, an automatic procedure can be implemented on-line for updating without any operator/engineer intervention.

A key advantage of this invention is that a process can be tested in one regulatory configuration and a model based controller can be commissioned with a different configuration. Temporary valve saturation can be dealt with easily with the operator's intervention.

Thus, this new invention will allow construction of high fidelity, useable off-line process simulator and will enhance the ability to implement and maintain model-based control applications.

While preferred forms of the invention have been disclosed and described in the drawings, since variations in the preferred forms will be evident to those skilled in the art, the invention should not be construed as limited to the specific

I claim:

1. A method of characterizing a dynamic process model relating a controlled variable process value to an independent variable process value, hereon simply referred to as a process model, for use in a model predictive controller of a process having a plurality of independently controllable manipulated variables and measured disturbance variables and at least one controlled variable dependent upon said independently controllable manipulated variables comprising:
   a) first sub process models relating said controlled variable process value to each of said independently controllable manipulated variable process value and each of said measured disturbance variables process value, hereon called Controlled Variable Core Process Models,
   b) second sub process models relating each of said manipulated variables process value to said manipulated variable set point of said process model, hereon called Manipulated Variable Closed Loop Process Models, and
   c) sum of convolution of respective first sub process models with respective second sub process models and a first model mismatch error equating to said process model, expressed mathematically as, process model=Σfirst sub process model*second sub process model+Error1,
      whereby said process model can be updated when a change has been made in the tuning/configuration of any of said manipulated variables regulatory controllers with minimal amount of efforts.

2. Said process model of claim 1 wherein said first sub process model is independent of tuning and configuration of said manipulated variables regulatory controllers.

3. Said process model of claim 1 wherein said second sub process model is dependent of tuning and configuration of said manipulated variables regulatory controllers.

4. A method of identifying said sub process models as recited in claim 1 from the data gathered for identifying said process models by performing testing and measuring relating to said controlled variables, manipulated variables, and disturbance variables of said process by separately introducing a test disturbance in each of said manipulated variables while keeping all of regulatory controllers of said process in closed loop and measuring the effect of the disturbances on said controlled variables and said manipulated variables process value, comprising the steps:
   a) identifying Controlled Variable Core Process Models of said controlled variables relating to said manipulated variables process value and disturbance variables value from said data gathered,
   b) identifying Manipulated Variable Closed Loop Process Models of said manipulated variables process value relating to said manipulated variables set point and disturbance variables value from said data gathered.

5. A method for updating said process models in claim 1 when a change has been made to tuning/configuration of at least one of said manipulated variables, said process models and their sub-process models having been identified as recited in claim 4 comprising the steps of:
   a) updating said manipulated variables closed loop models for said change in the tuning/configuration of said manipulated variable set point regulatory controller,
   b) updating each of said process models by equating it by adding sum of convolution of previously identified respective Controlled Variable Core Process Models and said updated respective Manipulated Variables Closed Loop Process Models and said first mismatch error determined previously.

6. Said process model of claim 1 wherein said second sub process model, Manipulated Variable Closed Loop Process Models comprising:
   a) third sub process models relating manipulated variables process value in open loop to other manipulated variables process value and disturbance variable value, hereon known as Manipulated Variables Core Process Model,
   b) fourth sub process models relating manipulated variable closed loop process value when its value is caused to change due to an effect other than its regulatory controller output or outputs, hereon known as self disturbance rejection model, and
   c) sum of convolution of respective third process models with respective fourth process models and a second model mismatch error equating to said second sub process model, that is, second sub process model=Σthird sub process model*fourth sub process model+Error2,
      whereby said process model of claim 1 can be updated when a change has been made in the tuning/configuration of any of said manipulated variables regulatory controllers with updating of only one fourth sub process model relating to the manipulated variable whose tuning/configuration has been changed.

7. The method of updating process models of claim 5 wherein said step of updating said manipulated variables closed loop models for a change in the tuning of the manipulated variable regulatory controller further comprising the steps:
   a) step testing of set point of each of said manipulated variable,
   b) collecting of data of about all manipulated variables process values, all manipulated variables set point and measured disturbance variables, and
   c) identifying closed loop models of each of said manipulated variables process value from said data gathered.

8. The method of updating process models of claim 5 wherein said step of updating said manipulated variables closed loop models for said change in configuration to manual control further comprising the steps:
   a) step testing of set point of each of said manipulated variable except said manipulated variable with configuration set to manual control,
   b) collecting of data of all manipulated variables process values, and
   c) identifying closed loop models of each of said manipulated variables process value with the exception of closed loop model of manipulated variable process value to its set point for said manipulated variable in manual control set to unity.

9. Said second sub process model of claim 6 wherein said third sub process model is independent of tuning and configuration of said manipulated variables regulatory controllers.

10. A method for updating process models for use in a model predictive controller of a process having a plurality of independent controllable, manipulated variables and measured disturbance variables and at least one controlled variable dependent upon said independently controllable manipulated variables when a change has been made to tuning/configuration of at least one of said manipulated variables, said process models and their sub-process models having been identified as recited in claim 4 comprising the steps of:
  a) updating said manipulated variables closed loop models for said change in the tuning/configuration of said manipulated variable set point regulatory controller,
  b) updating each of said process models by equating it by adding sum of convolution of previously identified respective Controlled Variables Core Process Models and said updated respective manipulated variables closed loop models and said first model mismatch error determined previously.

11. A method of applying correction to the predicted value of said controlled variables of for use in said model predictive controller using said process models and said sub process models as recited in claim 1 comprising the steps of:
  a) predicting core process model based future value of said controlled variable using its core process models in response to measured change in each of said manipulated variables process value,
  b) calculating a core process model based bias correction for said controlled variable as a difference of measured value of said controlled variable and said core process model based predicted value at current time, and
  c) correcting said predicted controlled variable value by adding said core process model based bias correction.

12. A method of creating a simulator for use in process simulation and for operators training using process models and sub process models as recited in claim 1 wherein said process models can be updated when a change has been made to the tuning/configuration of one or more of the manipulated variables set point regulatory controllers in emulating different plant conditions and different operator's action thereof.

13. An alternate method of plant testing in which PV-based version of said process models as recited in claim 1 are identified and which are then translated to SP-based models whereby reducing the amount of plant data required.

14. Said second sub process model of claim 9 wherein said fourth sub process model is dependent of tuning and configuration of said manipulated variables regulatory controllers.

15. Said fourth sub process model of claim 9 wherein further said equating to difference of a unit model and said manipulated variable closed loop model relating to its set point.

16. A method of identifying said four sub process models as recited in claim 1 from the data gathered by performing testing and measuring relating to said controlled variables, manipulated variables, and disturbance variables of said process by separately introducing a test disturbance in each of said manipulated variables while keeping all of regulatory controllers of said process in closed loop and measuring the effect of the disturbances on said controlled variables and said manipulated variables process value, comprising the steps:
  a) identifying first sub process models, Controlled Variable Core Process Models of said controlled variables relating to said independent variables value comprising of manipulated variables set point and disturbance variables value from said data gathered for generating the process models,
  b) identifying second sub process models, Manipulated Variable Closed Loop Process Models of said manipulated variables process value relating to said independent variables value comprising of manipulated variables set point and disturbance variables value from said data gathered for generating process models, and
  c) performing an additional plant test to gather data about manipulated variables process value, manipulated variables set point and disturbance variables, and
  d) using said additional plant test data gathered identifying manipulated variables core process models.

17. The step of performing said additional plant test in claim 15 wherein farther comprising the steps:
  a) setting each manipulated variable set point in manual control mode in turn, while keeping all other manipulated variables in closed loop, and
  b) unit step testing each of other manipulated variables in closed loop, and
  c) gathering data about manipulated variable process values.

18. The step of updating said manipulated variables dosed loop model in claim 17 wherein further comprising the steps:
  a) Updating said fourth sub process model corresponding to said manipulated variables with changed tuning/configuration,
  b) Equating sum of convolution of respective third sub process models with respective fourth sub process models and said second model mismatch error to second sub process model relating to each of said independent variables.

* * * * *